United States Patent [19]

Hill et al.

[11] Patent Number: 5,133,100
[45] Date of Patent: Jul. 28, 1992

[54] PORTABLE TRUCK WASHER

[76] Inventors: James D. Hill, R.F.D. 3, Fairmont, Minn. 56031; James W. Shell, R.F.D. 1, Welcome, Minn. 56181

[21] Appl. No.: 684,326

[22] Filed: Apr. 12, 1991

[51] Int. Cl.$^5$ ............................................. B60S 3/06
[52] U.S. Cl. ................................. 15/53.2; 15/DIG. 2
[58] Field of Search ............... 15/DIG. 2, 53.1, 53.2, 15/97.3, 88.4

[56] References Cited

U.S. PATENT DOCUMENTS

| | | | |
|---|---|---|---|
| 2,253,609 | 8/1941 | Byron et al. | 15/53.2 |
| 2,636,198 | 4/1953 | Wilson | 15/53.2 |
| 2,876,472 | 3/1959 | Rousseau | 15/53.2 |
| 2,950,492 | 8/1960 | Liekweg | 15/53.2 |
| 3,104,406 | 9/1963 | Rhodes | 15/53.1 |

FOREIGN PATENT DOCUMENTS

| | | | |
|---|---|---|---|
| 3403415 | 10/1984 | Fed. Rep. of Germany | 15/DIG. 2 |
| 0556785 | 5/1977 | U.S.S.R. | 15/53.2 |

*Primary Examiner*—Edward L. Roberts

[57] ABSTRACT

For washing the exterior of large vehicles such as trailers, busses, or truck tractors a portable washing device including a rotating brush assembly which can be raised and lowered. Water or other liquid can be supplied to the brush assembly for washing the vehicle. The entire device is mounted on a transmitting chassis capable of sharp turns especially in one direction so that it can move around the vehicle to be washed. The brush is also movable to a horizontally disposed carrying position, or can be tilted to maintain contact with the vehicle even when either it or the washer is on uneven ground.

3 Claims, 7 Drawing Sheets

PORTABLE TRUCK WASHER

BACKGROUND AND SUMMARY OF THE INVENTION

This invention pertains to devices to wash the exterior of vehicles and more particularly to such a device which can be driven around and will reach the sides of the vehicle using a rotating brush to which soapy water or the like has been applied.

For many years, passenger automobiles have been scrubbed by rotating brushes mounted on a frame which passes back and forth alongside the car—and in most instances a similar brush washes the top of the auto. However, large truck tractors, semitrailers and buses require much larger assemblies and therefore are much less common.

There are also other common devices for washing the larger vehicles. For example, high pressure jets to cause water to impinge on the side of the track or bus are used to dislodge dirt and grease, thus cleaning the vehicle. Such jets may be followed by a flushing with either low or high pressure water.

By my invention I provide a washer somewhat similar to the automobile washing devices. However, rather than mount the device on a frame having limited movement, and using a large brush the full height of the truck, I provide for a driveable chassis on which the brush may be mounted for movement in a vertical direction. I also provide for movement of the brush to a horizontal axis for transport from one place to another.

DESCRIPTION

Figure 1:
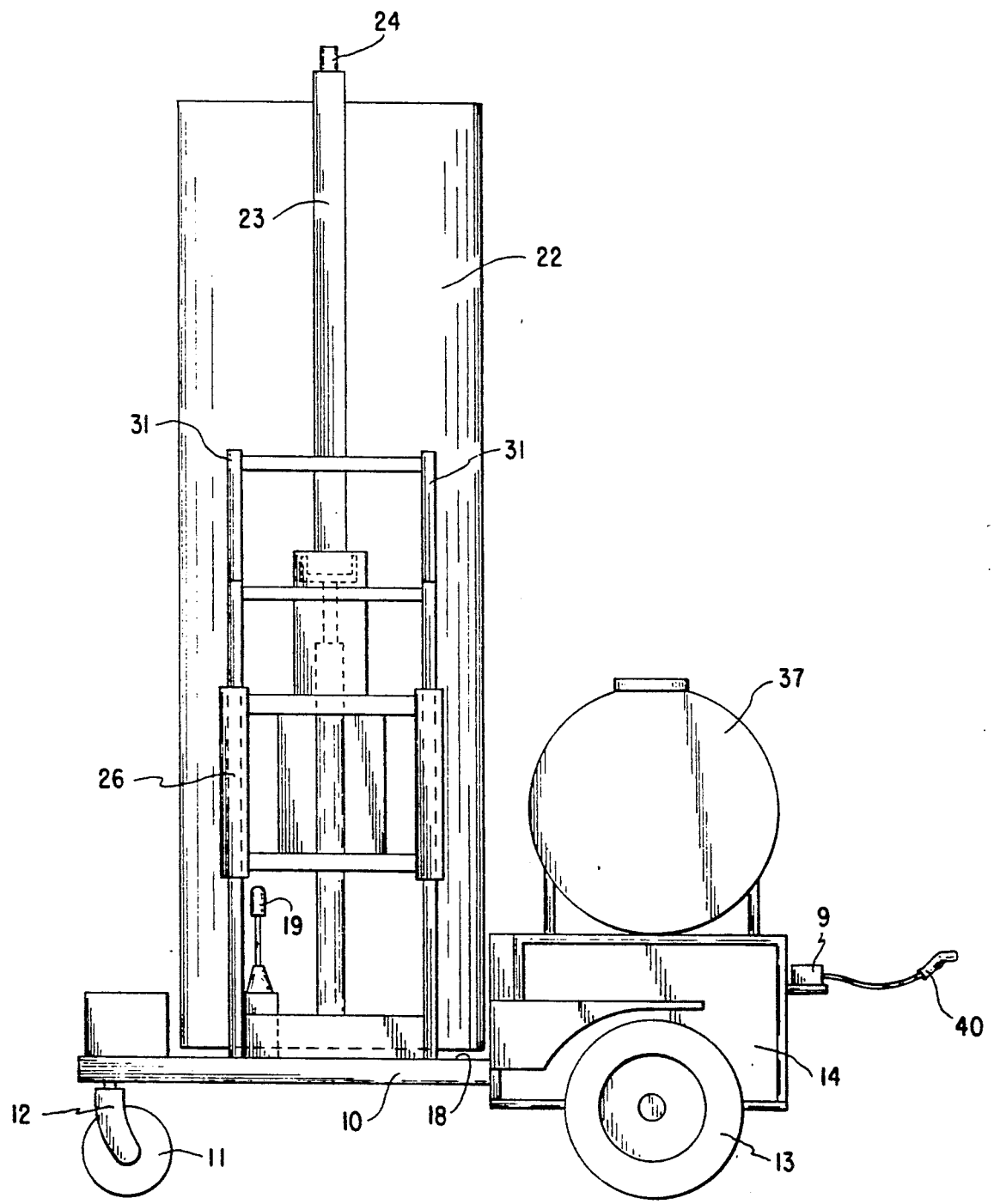
FIG. 1 is a side elevational view of a first embodiment of my machine with the brush assembly in a raised position.
Figure 2:
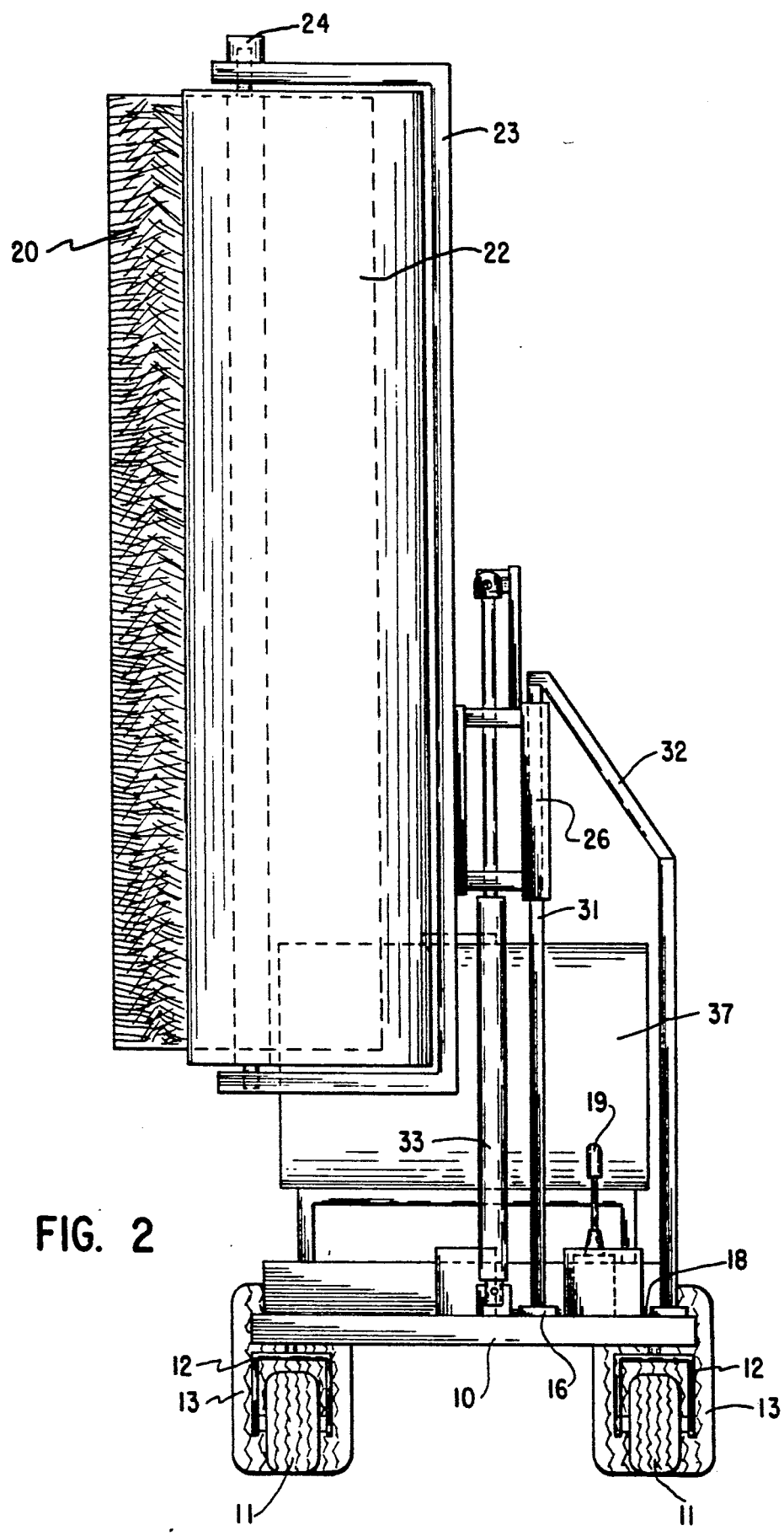
FIG. 2 is a front elevational view of the machine.
Figure 3:
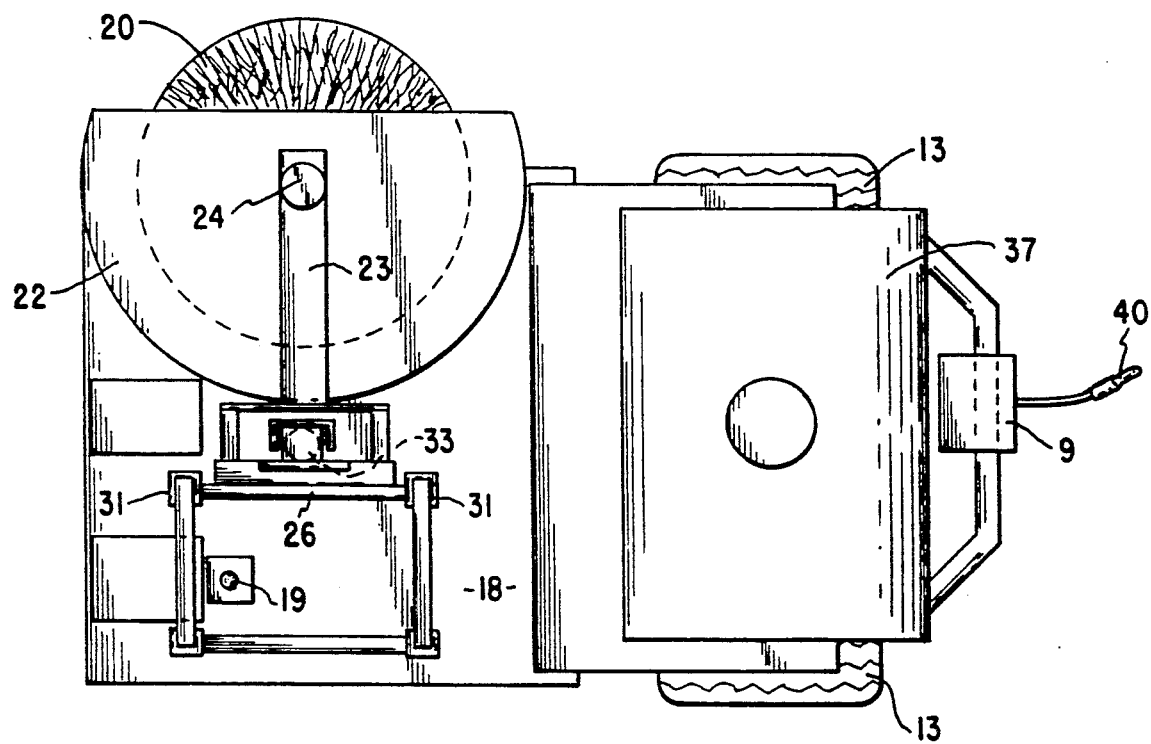
FIG. 3 is a top view of the machine.

Briefly my invention comprises a completely mobile machine including a surface washing mechanism adapted to be moved along the sides of and around a motor vehicle so that the vehicle can be washed by the machine. Provision is made for raising, lowering and turning the brush mechanism.

More specifically and referring to the drawings of the first embodiment, the machine includes a frame 10 mounted on wheels. The front wheels 11 are mounted in castering brackets 12 so they can turn in response to differential rotation of the rear wheels 13. The rear wheels are driven by a power supply enclosed in a housing 14. In my preferred embodiment, I use hydrostats to drive each wheel. In that configuration, the power supply would include an engine driving a hydraulic pump. The pump, in turn, would supply hydraulic fluid under pressure to individual hydrostats driving each rear wheel 13. The hydraulic pressure would also be available for other uses. The engine also drives a water pump 9 to provide for a pressured supply of water for the washing operation. All of the described mechanism is commonplace, so little or none of it is shown nor described in detail. It is important, however, that the rear wheels 13 be individually driven so that one can be driven in a forward direction while the other is reversed, thus allowing complete rotation of the machine in place, or similar very short radius turns.

The operator may be seated or stand on the platform 18 and will use a control mechanism for steering and moving the device. The controls may be operated through a joy stick 19 in a manner well known in the art.

The principal operating parts of the device include a rotating brush 20 of the type commonly used in stationary auto-wash booths. A protective shield or guard 22 surrounds most of the brush to avoid indiscriminate spraying of water. The shield is mounted on a support 23 which also provides bearing supports for the brush. The hydrostat 24 which drives the brush rotationally is also mounted on this support.

The support 23 is pivotally connected to a carriage 26. The pivot is provided by a stub 27 (FIG. 5) on the support 23 extending into a socket in the carriage. This type of mounting allows the brush and its shield 22 to be moved from the normal use position with a vertical axis as shown in FIGS. 1–4 to a transport position with a horizontal axis as shown in FIG. 5. There are many ways to hold the brush in its varied positions. I have chosen to illustrate a very simple one using a pin 30 extending through the stub 27.

The carriage 26 is slidably mounted on a pair of vertical slide bars 31 which extend upwardly from a plate 16 mounted on the platform 18 on the frame and are supported by a support frame 32. Control of the vertical position of the carriage 26 on the bars 31 is maintained by use of a hydraulic piston/cylinder assembly 33. This assembly, as shown, has a relatively long stroke, but it is envisioned that a shorter stroke drive with a multiplier could be used to accomplish the same purpose. That purpose is to raise and lower the brush 20 and its shield 22 to whatever height is necessary to provide cleaning for the upper parts on the side of the truck or trailer body (not shown). The brush can also be lowered to allow for cleaning as low as the wheels of the truck or trailer.

Figure 4:
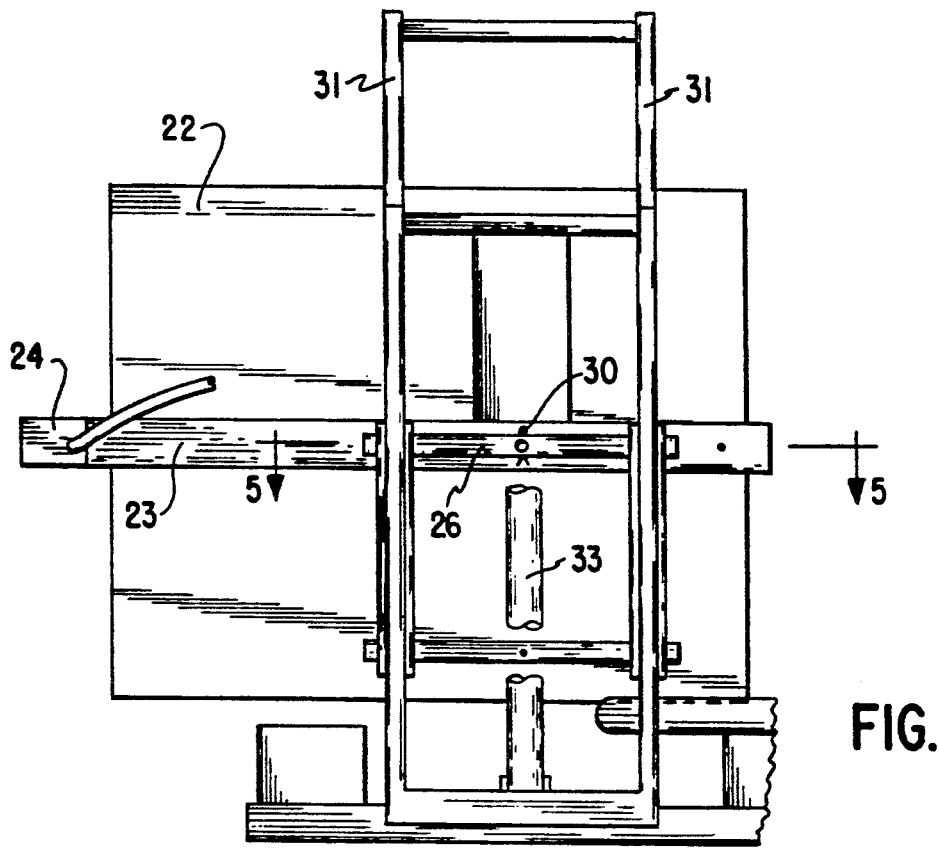
FIG. 4 is a detailed elevational view of the lifting and brush mechanism showing the brush in position for being transported.
Figure 5:
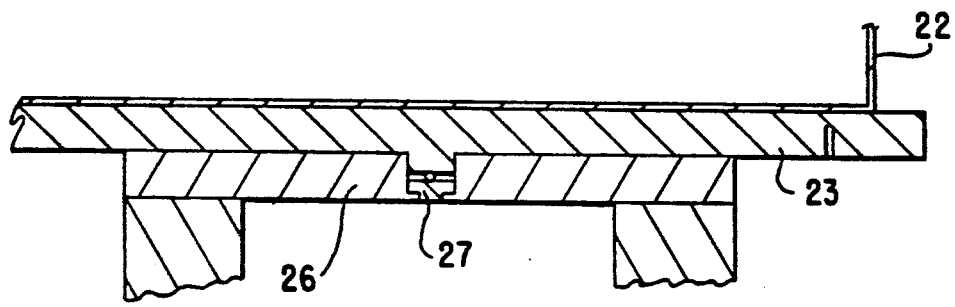
FIG. 5 is a view from line 5—5 of FIG. 4.
Figure 6:
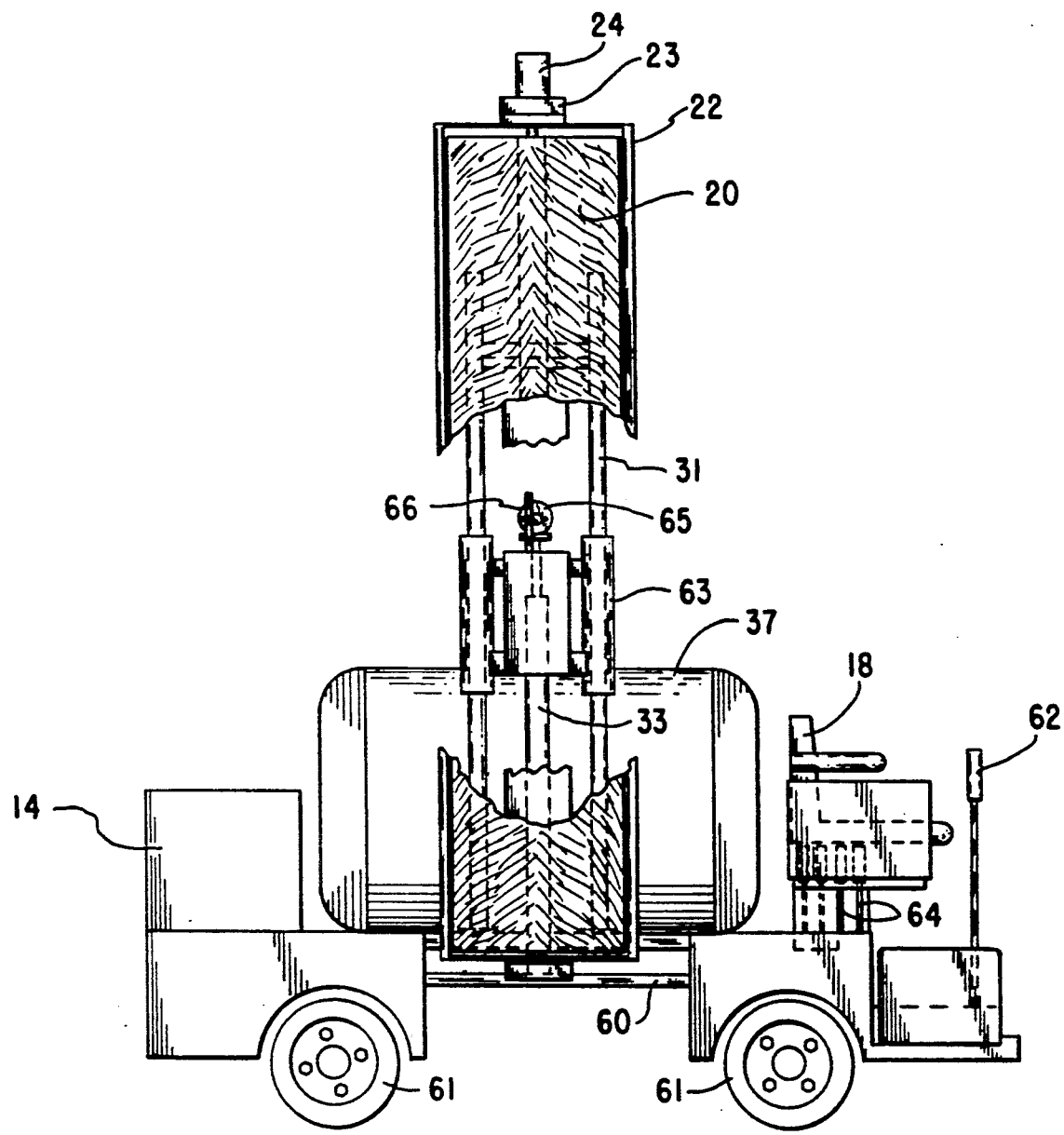
FIG. 6 is a side elevations view of an alternative embodiment of my invention.
Figure 7:
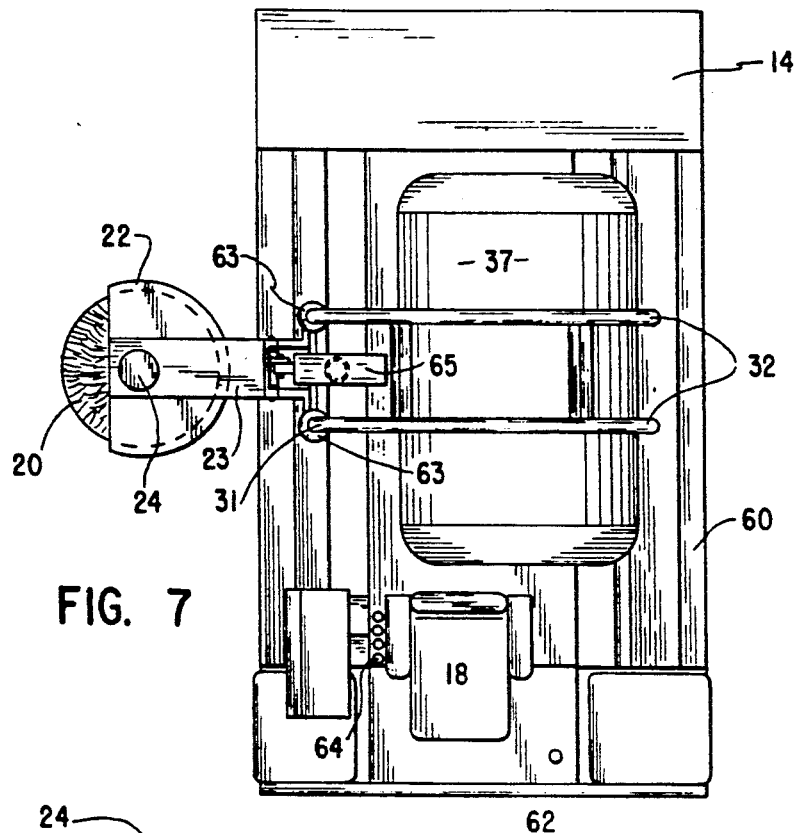
FIG. 7 is a top view of the embodiment of FIG. 6.
Figure 8:
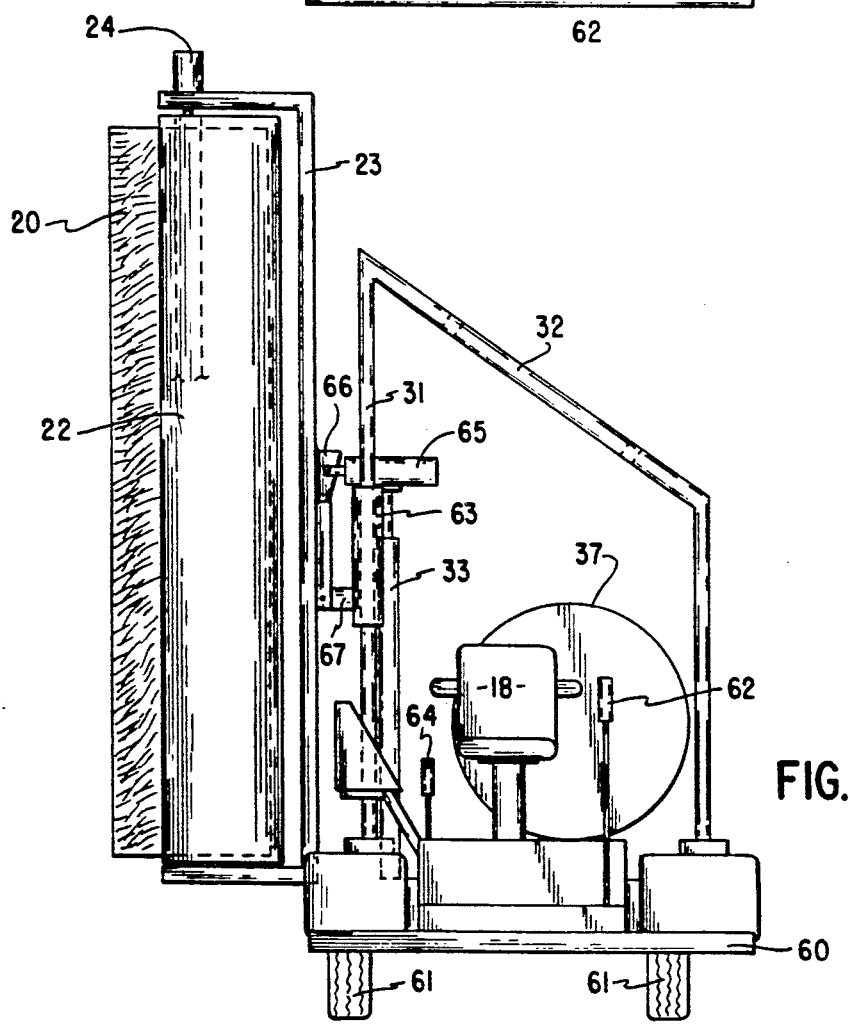
FIG. 8 is a front elevations view of the washer of FIG. 6.
Figure 9:
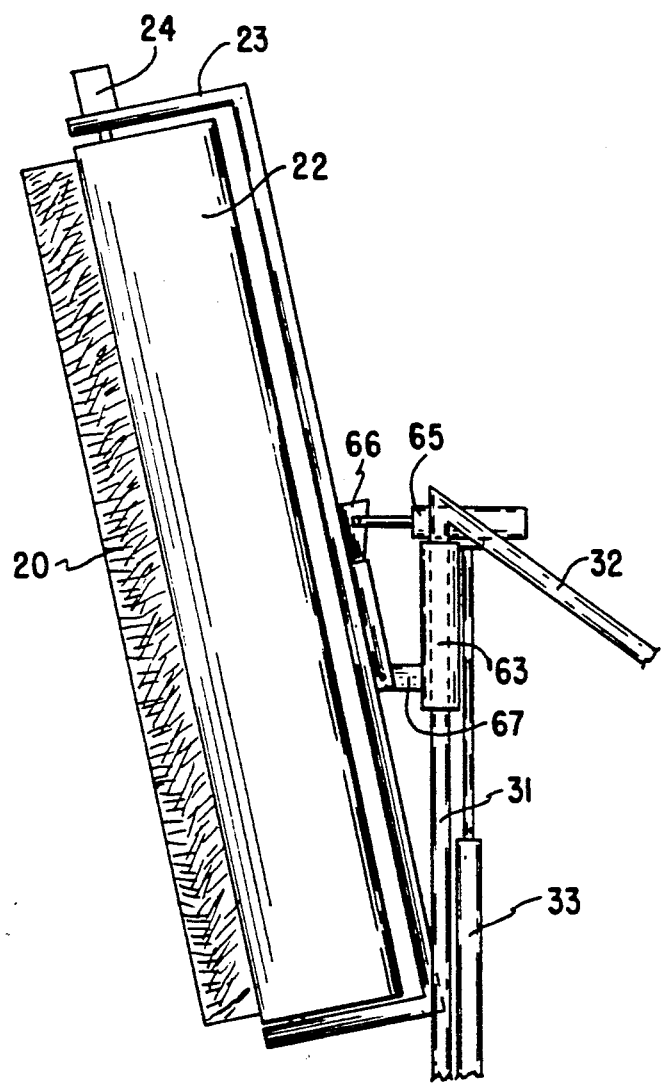
FIG. 9 is a detailed partial view of the tilting brush mechanism of the alternative.

In use, the device is stored or transported with the rush 20 in the position shown in FIG. 4. The operator controls the transit through the stick 19 which allows him or her to drive the device close to a truck or trailer body. The brush 20 is then turned to the vertical position. The hydrostat 24 is actuated to start rotating the brush, and water or soapy water is delivered to the brush from the tank 37 through tubing (not shown because it is conventional and to avoid undue cluttering of the figures). As the brush receives the cleaning liquid, it is driven along the side of the body so that the brush washes the sides. At either end of the body, the sharp turning ability of the device allows it to turn at a right angle so that it can immediately be used to wash the end of the vehicle. For specialty washing, such as between the spokes of the wheels or other specific corners, it is simple to provide a nozzle and wand 40 to deliver high pressure water to flush off such areas.

Thus, with this first embodiment it is possible to completely wash a truck, semitrailer or bus simply by standing the vehicle stationary and driving the washer assembly around it.

An alternative, which is substantially similar, and in some cases may be preferred is shown in FIGS. 6 to 9. This embodiment also includes a frame 60 mounted on wheels 61. These wheels may be turnable for steering by any means known in the art. Preferably both front and rear sets of wheels can be steered to turn the unit in the direction towards the side on which the brush 20 is mounted. In that way the assembly can be turned sharply in that direction. Steering in the opposite direction may be much less sharp. Control of the steering is again preferably operated through a joy-stick 62. Thus, the operator seated on the seat 18 can use one hand on the stick 62 and have the other free to operate brush and washer controls 64. The controls 64 may also include a control for rear wheel steering.

As in the previously described embodiment, power is provided by a conventional power unit enclosed in a housing 14 on the rear of the unit. Because power is provided preferably by individual hydrostats, it should be noted that the device can be driven either by two or four wheels.

In this embodiment, the brush assembly uses essentially the same components including the protective shield or guard 22 around the brush 20. The support mechanism is also much the same including the support 23 and the brush-driving hydrostat 24.

The carriage mechanism is somewhat different. A slide mechanism 63 is slidably mounted on the slide bars 31. These bars are supported by a support frame 32 in the same manner as in the first described embodiment. The slides structure 63 is moved vertically along the bars by a hydraulic piston and cylinder assembly 33 as noted before.

In this embodiment, the principal difference is a provision for tilting the brush so it can clean a sloping surface or clean a truck tilted slightly with respect for the washer. That provision includes a hydraulic piston/cylinder assembly 65 mounted on the top of the slide 63. This assembly 65 also connects to a bracket 66 on the support 23. At a point displaced from the bracket 66, the support 23 is pivotally connected to an ear 67 fixed on the slide 63. Thus, operation of the piston/cylinder assembly will cause the support 23, and therefore, the brush 20, to tilt more or less toward the object being washed. This feature is particularly useful when the surface on which the device is operated slopes toward or away from the truck being washed.

A second improvement of this embodiment over that first described is the avoidance of a need for a support castor for the brush. This is accomplished by placing the water tank 37 with its axis in the direction of normal movement of the device, and offset on the frame to counterbalance the weight of the brush assembly.

Thus, this second embodiment will accomplish all that the first described device will do and has certain advantages in construction and usefulness.

I claim as my invention:

1. A truck and bus washer comprising carrier means by which said washer can be moved past a stationary vehicle, said carrier means including at least two driven wheels, said wheels being independently driven and reversible, hydraulic power means connected to said driven wheels to provide for said independent driving, washing means including a cylindrical brush, shield means partially surrounding said brush, said shield means being mounted for vertical movement and said brush being rotatably mounted within said shield means, hydraulic motor means mounted on said shield means operably connected to said brush to drive said brush rotatably within said shield means, said carrier means including a frame, said frame including an outrigger, vertical bars on said outrigger, said shield means being slidably mounted on said vertical bars and power means connected between said frame and said guard means to slidably raise and lower said shield means and said brush on said vertical bars, and a carriage slidably journalled on said vertical bars, said shield means being pivotally mounted on said carriage whereby said shield means and the associated brush may be turned from a use position where the axis of the brush is vertical to a transport position where the axis is horizontal.

2. The washer of claim 1 in which said shield means is tiltably mounted on said carrier means whereby said brush can be tilted toward and away from said carrier means.

3. The washer of claim 2 in which hydraulic operating means is engaged between said shield means and said carrier means to tilt said shield means.

* * * * *